US012577440B2

(12) United States Patent
Markland, Jr. et al.

(10) Patent No.: US 12,577,440 B2
(45) Date of Patent: Mar. 17, 2026

(54) ADHESIVE COMPRISING POLYVINYL ACETATE AND A MIXTURE OF GLUCOSE AND FRUCTOSE

(71) Applicant: CARGILL, INCORPORATED, Wayzata, MN (US)

(72) Inventors: Flave Eugene Markland, Jr., Atkins, IA (US); Richard Thalhofer, Ratingen (DE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 18/873,619

(22) PCT Filed: Jun. 27, 2023

(86) PCT No.: PCT/US2023/069173

§ 371 (c)(1),
(2) Date: Dec. 10, 2024

(87) PCT Pub. No.: WO2024/006761

PCT Pub. Date: Jan. 4, 2024

(65) Prior Publication Data

US 2025/0163303 A1        May 22, 2025

Related U.S. Application Data

(60) Provisional application No. 63/367,254, filed on Jun. 29, 2022.

(51) Int. Cl.

| | |
|---|---|
| *C09J 11/06* | (2006.01) |
| *B32B 7/12* | (2006.01) |
| *B32B 21/13* | (2006.01) |
| *B32B 37/12* | (2006.01) |
| *B32B 37/18* | (2006.01) |
| *C08K 5/053* | (2006.01) |
| *C08K 5/1535* | (2006.01) |
| *C08K 5/1545* | (2006.01) |
| *C08L 31/04* | (2006.01) |
| *C09J 131/04* | (2006.01) |

(52) U.S. Cl.

CPC ................ *C09J 11/06* (2013.01); *B32B 7/12* (2013.01); *B32B 21/13* (2013.01); *B32B 37/12* (2013.01); *B32B 37/18* (2013.01); *C09J 131/04* (2013.01); *B32B 2037/1276* (2013.01); *B32B 2255/08* (2013.01); *B32B 2255/26* (2013.01); *B32B 2307/748* (2013.01); *B32B 2317/16* (2013.01); *C08K 5/053* (2013.01); *C08K 5/1535* (2013.01); *C08K 5/1545*

(2013.01); *C08L 31/04* (2013.01); *C09J 2301/408* (2020.08); *C09J 2431/00* (2013.01)

(58) Field of Classification Search

CPC ....................... C09J 2301/408; C09J 2431/00; C09J 131/04; C09J 11/06; C08K 5/053; C08L 31/04

See application file for complete search history.

(56) References Cited

U.S. PATENT DOCUMENTS

| | | |
|---|---|---|
| 5,306,749 A | 4/1994 | Columbus |
| 5,519,072 A | 5/1996 | Wieczorek, Jr. |
| 6,114,464 A | 9/2000 | Reck et al. |
| 6,268,413 B1 | 7/2001 | Columbus |
| 7,687,555 B2 | 3/2010 | Lundquist et al. |
| 8,445,564 B2 | 5/2013 | Kelly |
| 8,501,838 B2 | 8/2013 | Jackson et al. |
| 8,845,851 B2 | 9/2014 | Allen et al. |
| 9,493,617 B2 | 11/2016 | Zhang et al. |
| 10,961,421 B2 | 3/2021 | Anderson et al. |
| 2003/0000643 A1 | 1/2003 | Herlfterkamp |
| 2004/0007156 A1 | 1/2004 | Thames et al. |

(Continued)

FOREIGN PATENT DOCUMENTS

| | | |
|---|---|---|
| AU | 2010286553 A1 | 2/2012 |
| EP | 4071216 A1 | 10/2022 |

(Continued)

OTHER PUBLICATIONS

Alexander, Eagan Press Handbook Series—Sweeteners: Nutritive, Ch. 3: Production and Description, Aug. 1, 1997, American Association of Cereal Chemists, p. 17-29 (Year: 1997).

(Continued)

*Primary Examiner* — Kregg T Brooks
*Assistant Examiner* — David R. Foss

(57) ABSTRACT

Aqueous adhesive compositions comprising polyvinyl acetate can be extended by a) providing an adhesive polymer component wherein at least about 75% of adhesive polymer materials present in the adhesive polymer component is polyvinyl acetate; b) providing an aqueous saccharide composition comprising fructose and glucose in a fructose to glucose weight ratio of from about 3:10 to about 10:3, wherein the fructose and glucose combined are at least about 50 percent of all saccharides present in the aqueous saccharide composition. The aqueous saccharide composition has a total saccharides dry solids content of at least 70 percent by weight based on the total aqueous saccharide composition. The adhesive polymer component is mixed with the aqueous saccharide composition to form an extended aqueous adhesive composition comprising from about 5 to about 50 percent by dry weight of the saccharide composition. Compositions and methods of use are also described.

19 Claims, No Drawings

(56) References Cited

U.S. PATENT DOCUMENTS

| | | |
|---|---|---|
| 2004/0197463 A1 | 10/2004 | Gottemoller |
| 2004/0220368 A1 | 11/2004 | Li et al. |
| 2006/0062891 A1 | 3/2006 | Gottemoller |
| 2007/0122644 A1 | 5/2007 | Jarck |
| 2007/0148339 A1 | 6/2007 | Wescott et al. |
| 2008/0102167 A1 | 5/2008 | Gottemoller |
| 2009/0042019 A1 | 2/2009 | Nilsson |
| 2009/0155447 A1 | 6/2009 | Moore et al. |
| 2009/0314427 A1 | 12/2009 | De Almeida Lima |
| 2010/0027370 A1 | 2/2010 | Magnin |
| 2010/0069533 A1 | 3/2010 | Brady et al. |
| 2010/0087571 A1 | 4/2010 | Jackson et al. |
| 2010/0285295 A1 | 11/2010 | Wang et al. |
| 2010/0310893 A1 | 12/2010 | Derbyshire et al. |
| 2011/0003522 A1 | 1/2011 | Chen et al. |
| 2011/0021101 A1 | 1/2011 | Hawkins et al. |
| 2011/0052881 A1 | 3/2011 | Netravali et al. |
| 2011/0065842 A1 | 3/2011 | Weinkoetz et al. |
| 2011/0287162 A1 | 11/2011 | Gottemoller |
| 2011/0311833 A1 | 12/2011 | Parker et al. |
| 2012/0135116 A1 | 5/2012 | Anderson |
| 2012/0149813 A1 | 6/2012 | Kelly |
| 2012/0289628 A1 | 11/2012 | Ceulemans |
| 2013/0047888 A1 | 2/2013 | Mueller et al. |
| 2013/0059075 A1 | 3/2013 | Appley et al. |
| 2013/0131223 A1 | 5/2013 | Bouguettaya et al. |
| 2013/0131230 A1 | 5/2013 | Bouguettaya et al. |
| 2013/0190428 A1 | 7/2013 | Varnell |
| 2013/0287993 A1 | 10/2013 | Williamson et al. |
| 2014/0087122 A1 | 3/2014 | Combs et al. |
| 2014/0329936 A1 | 11/2014 | Zhang et al. |
| 2014/0364029 A1 | 12/2014 | Hawkins et al. |
| 2015/0044483 A1 | 2/2015 | Parker et al. |
| 2015/0086775 A1 | 3/2015 | Allen et al. |
| 2015/0090156 A1 | 4/2015 | Combs |
| 2016/0177068 A1 | 6/2016 | Hjelmgaard et al. |
| 2016/0257815 A1 | 9/2016 | Varnell |
| 2016/0333240 A1 | 11/2016 | Grigsby |
| 2017/0266930 A1 | 9/2017 | Via et al. |
| 2018/0371309 A1 | 12/2018 | Chan et al. |
| 2019/0009427 A1 | 1/2019 | Tamogami |
| 2019/0048501 A1 | 2/2019 | Lester et al. |
| 2019/0061325 A1 | 2/2019 | Hand |
| 2019/0144727 A1 | 5/2019 | Anderson et al. |
| 2020/0071530 A1 | 3/2020 | Birkeland |
| 2021/0129375 A1 | 5/2021 | Valenzuela et al. |
| 2022/0002597 A1 | 1/2022 | Tisserat |
| 2023/0135128 A1 | 5/2023 | Le Fur et al. |

FOREIGN PATENT DOCUMENTS

| | | | | |
|---|---|---|---|---|
| GB | 2179953 A | * | 3/1987 | ........... C09J 131/04 |
| WO | 2009/080696 A2 | | 7/2009 | |
| WO | 2009/080697 A1 | | 7/2009 | |
| WO | 2013/112445 A1 | | 8/2013 | |
| WO | 2015/092750 A1 | | 6/2015 | |
| WO | 2017/193015 A1 | | 11/2017 | |
| WO | 2020/231771 A1 | | 11/2020 | |
| WO | 2021/084031 A1 | | 5/2021 | |
| WO | 2021/158599 A1 | | 8/2021 | |
| WO | 2021/168114 A1 | | 8/2021 | |
| WO | 2021/243235 A1 | | 12/2021 | |
| WO | 2022/140680 A1 | | 6/2022 | |
| WO | 2022/250698 A1 | | 12/2022 | |
| WO | 2022/250734 A1 | | 12/2022 | |
| WO | 2023/006847 A1 | | 2/2023 | |
| WO | 2023/122515 A1 | | 6/2023 | |
| WO | 2024/155315 A1 | | 7/2024 | |
| WO | 2025/188592 A1 | | 9/2025 | |
| WO | 2025/217243 | | 10/2025 | |

OTHER PUBLICATIONS

Helgeson-Lehmann, What is Dextrose Equivalent (DE)?, Dec. 4, 2024, Lehmann Ingredients, p. 1-14 (Year: 2024).

Huang, J. et al., "Development and characterization of a formaldehyde-free adhesive from lupine flour, glycerol, and a novel curing agent for particleboard (PB) production", Holzforschung, vol. 70, No. 10, Oct. 1, 2016, pp. 927-935.

Kumar et al., "Adhesives and plastics based on soy protein products", Industrial Crops and Products, vol. 16, Issue 3, Nov. 2002, pp. 155-172.

Noulis et al., "Sodium Trimetaphosphate Crosslinked Starch Films Reinforced with Montmorillonite", Polymers, 2023, 15, 3540, https://doi.org/10.3390/polym15173540, pp. 1 to 12.

Particle Size Effect on Soy Protein Isolate Extraction, Journal of Food Processing and Preservation, Jun. 2007, vol. 31 (3), p. 308-319 hereinafter "Russin". (Year: 2007).

Pelgrom et al. Method Development to Increase Protein Enrichment During Dry Fractionation of Starch-Rich Legumes. Food Bioprocess Technol (2015) 8:1495-1502.

Zhang et al., "Preparation of a High-Temperature Soybean Meal-Based Adhesive with Desired Properties via Recombination of Protein Molecules", ACS Omega, vol. 7, Issue 27, Jun. 24, 2022, pp. 23138-23146.

* cited by examiner

ADHESIVE COMPRISING POLYVINYL ACETATE AND A MIXTURE OF GLUCOSE AND FRUCTOSE

CROSS-REFERENCE TO RELATED APPLICATIONS

This application is a national phase application of PCT Application No. PCT/US2023/069173, filed Jun. 27, 2023, which claims the benefit of U.S. Provisional Application No. 63/367,254, filed Jun. 29, 2022, each of which is incorporated by reference herein in its entirety.

FIELD

The present invention relates to adhesives. More specifically, the present application relates to adhesives comprising polyvinyl acetate and saccharide components.

BACKGROUND

Adhesives comprising polyvinyl acetate have been known for many years. A water based thixotropic adhesive gel is described in U.S. Pat. No. 5,306,749 as comprising an aqueous emulsion of polyvinyl acetate in an amount sufficient to form adhesive bonds on wood; partially hydrolyzed polyvinyl alcohol in an amount sufficient to provide wet tack of the adhesive; glyoxal in an amount sufficient to provide water resistance to the adhesive; and wood flour in an amount sufficient to increase the water resistance imparted by the glyoxal and to provide sanding and staining properties to the adhesive; and xanthan gum in an amount sufficient to provide a thixotropic index and viscosity. Aqueous adhesive preparations, more particularly for labeling bottles, are described in US Publ. Pat. Appln No. 2003/0000643 containing 1 to 70% by weight of a copolymer of monomers containing acid groups and hydrophobic monomers and, if desired, one or more auxiliaries for improving wet adhesive strength and/or for controlling open time and, if desired, preservatives, defoamers, dyes and/or other typical auxiliaries as labeling adhesives for bonding water-permeable hydrophilic substrates to hard surfaces. The use of auxiliaries for controlling the open time, including sugars, and mono-, di- or polyalcohols, for example, is also discussed. US Publ. Pat. Appln No. 2010/0027370 describes preparation of a water based adhesive by mixing a re-dispersible powder adhesive and water, optionally together with other components.

Various adhesive formulations with saccharide additives have also been described. For example, the use of adhesives for preparing wood-based materials (for example, plywoods (veneer board, etc.), particle boards, fiber boards (medium density fiberboard: MDF, etc.), and laminated woods) is described in US Publ. Pat. Appln No. 2019/0009427, where the composition comprises (A) a saccharide; (B) a water-soluble synthetic resin; and (C) an inorganic acid ammonium salt.

Adhesive compositions including at least 7% and at most 30% by weight of adhesive component, which adhesive component includes at least one polyvinyl alcohol and/or at least one dextrin and/or at least one starch, further including a carbomer and optionally a boron compound, wherein the pH of the composition is at most 13.0 and, if starch and the boron compound are present, more than 91.0% of all the starches in the composition are in a cold water insoluble form are described in US Publ. Pat. Appln No. 2012/0289628.

U.S. Pat. No. 6,268,413 describes a high strength adhesive comprising: (a) water present in an amount of from about 40 percent to about 70 percent by weight; (b) polyvinyl acetate present in an amount of about 15 percent to about 35 percent by weight; (c) dextrin present in an amount from about 5 percent to about 35 percent by weight; and (d) starch present in an amount from about 0 percent to about 5 percent by weight; the adhesive having at least 30% by weight solids, having a paste-like consistency, and having a bond strength greater than about 2000 p.s.i. as measured by ASTM D-905.

US Publ. Pat. Appln No. 2009/0314427 describes a method for extending resin-based wood glues, particularly condensation polymer resin-based glues, comprises the steps of (i) providing an aqueous extender composition comprising 20% to 50% by weight of alkali metal silicate and 1% to 25% by weight of polyhydric alcohol, preferably a sugar such as sucrose, (ii) providing a solution comprising a resin and (iii) blending the aqueous extender and the solution together to form a glue.

SUMMARY

It has been found that aqueous adhesive compositions comprising polyvinyl acetate can be advantageously extended by a) providing an adhesive polymer component wherein at least about 75% of adhesive polymer materials present in the adhesive polymer component is polyvinyl acetate; b) providing an aqueous saccharide composition comprising fructose and glucose in a fructose to glucose weight ratio of from about 3:10 to about 10:3, wherein the fructose and glucose combined are at least about 50 percent of all saccharides present in the aqueous saccharide composition, and the aqueous saccharide composition has a total saccharides dry solids content of at least 70 percent by weight based on the total aqueous saccharide composition. The adhesive polymer component is mixed with the aqueous saccharide composition to form an extended aqueous adhesive composition comprising from about 5 to about 50 percent by dry weight of the saccharide composition.

The use of aqueous saccharide composition as described herein for extending the aqueous adhesive in this manner advantageously provides an adhesive composition having a high biologically sourced content while surprisingly exhibiting excellent adhesion properties. The use of biologically sourced material permits an increase in naturally sourced ingredient content and may reduce the overall cost of raw materials used in the production of the adhesive.

In particular, it has been found that the selection of the monosaccharides of fructose and glucose, providing the fructose and glucose in the identified ratio to each other, and incorporation of the combination of fructose and glucose in the indicated amounts relative to the amount of the adhesive polymer component present in the aqueous adhesive composition provides surprising benefits.

While not being bound by theory, it is believed that the combination of the fructose and glucose as described herein does not crystallize in the aqueous vinyl acetate adhesive composition, and provides a more homogeneous, extended adhesive composition that is typically less affected by humid or wet conditions than a like aqueous vinyl acetate adhesive composition that is extended, for example, by addition of glucose without fructose. Thus, adhesives as described herein exhibit excellent wet strength characteristics.

Extended aqueous adhesive compositions as described herein exhibit excellent adhesive performance, such as dry bond strength, wet bond strength for uses under moist operation conditions, edge bonding performance, bonding performance between layers (such as in preparation of laminated materials including plywood, veneer board, and the like).

Extended aqueous adhesive compositions as described herein have been found to exhibit excellent stability over time. It has surprisingly been found that aqueous adhesive compositions extended as described herein are stable to undesirable separation under conventional storage and use conditions, even with high fructose and glucose content.

Additionally, extended aqueous adhesive compositions as described herein have been found to exhibit excellent biological stability over time.

Extended aqueous adhesive compositions as described herein exhibit excellent adhesive handling characteristics, including good viscosity characteristics for ease of application during use, and good workability through providing appropriate open time characteristics for various applications.

It has additionally surprisingly been discovered that the aqueous saccharide composition as described herein itself is stable over time and under conventional storage conditions, without crystallizing or separation, despite the high saccharide content of the composition. Moreover, the aqueous saccharide composition as described herein is biologically stable without the addition of agents such as biocides, and so can be stored without growth of mold, bacteria or other contaminating species. The aqueous saccharide compositions described herein can be easily incorporated into an aqueous vinyl acetate adhesive composition without the need for further processing of the aqueous saccharide composition (such as by chemical modification or application of heat, and the like) to physically adapt the aqueous saccharide composition in order to compatibilize the aqueous saccharide composition with the aqueous vinyl acetate adhesive composition. Because the aqueous saccharide composition as described herein does not crystallize under conventional storage conditions, this composition provides excellent advantages in ease of storage and use, because once saccharide components in a liquid composition crystallizes, it can be very difficult to redissolve the crystalline components to provide a homogeneous material for effective mixing.

It has also been found that the use of aqueous saccharide compositions comprising fructose and glucose as described herein can facilitate extension of adhesive compositions in a manner that lowers the observed viscosity of the adhesive and increases solids content without sacrifice of bond strength properties. This unique combination of properties obtainable in the extended adhesive composition provides significant material handling properties, blendability of the materials forming the extended adhesive composition, and flexibility in selecting the desired viscosity of the ultimate extended adhesive product.

DETAILED DESCRIPTION

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

The adhesive polymer component used in the present method is an adhesive formulation wherein at least about 75% of adhesive polymer materials present in the adhesive polymer component is polyvinyl acetate.

An example of such an adhesive is commercially available as Kestokol D-325 HF-T2547 Polyvinyl Acetate wood glue from KiiltoClean Oy, Turku, Finland.

In an aspect, the adhesive polymer component of (a) may be in the form of a dispersion in water and stabilized with polyvinyl alcohol). In an aspect, the adhesive polymer component of (a) may be a vinyl acetate homopolymer, stabilized with hydroxyethylcellulose and sold under the name Fulatex® by H. B. Fuller Company of St. Paul, MN. In an aspect, the adhesive polymer component of (a) may be a dextrin-stabilized polyvinyl acetate sold under the name Rhoplex 6215 from the Rohm & Haas Company of Philadelphia, Pa.

In an aspect, the adhesive polymer component of (a) comprises a synthetic or natural adhesive polymer other than polyvinyl acetate, and wherein at least about 80% of adhesive polymer materials present in the adhesive polymer component of (a) is polyvinyl acetate. In an aspect, at least about 90% of adhesive polymer materials present in the adhesive polymer component of (a) is polyvinyl acetate. In an aspect, at least about 95% of adhesive polymer materials present in the adhesive polymer component of (a) is polyvinyl acetate. In an aspect, at least about 99% of adhesive polymer materials present in the adhesive polymer component of (a) is polyvinyl acetate.

In an aspect, the synthetic or natural adhesive polymer other than polyvinyl acetate present in the adhesive polymer component of (a) is selected from the group consisting of polyvinyl alcohol, polyvinyl pyrrolidone, polyacrylates, polymethacrylates, polysaccharides, and mixtures thereof.

In an aspect, the adhesive polymer polysaccharides may be selected from cellulose, starch (amylose and amylopectin), guar, and dextrins. In an aspect, the adhesive polymer polysaccharides may be modified by, e.g., carboxymethyl, carboxyethyl, hydroxyethyl, hydroxypropyl, methyl, ethyl, propyl, or C4- to C20-alkyl groups, C4 to C20-alkyl succinimides, alginates, peptides and/or proteins such as gelatin, casein and/or soya proteins. In an aspect, the adhesive polymer polysaccharides are selected from starch ethers, hydroxyethyl and/or carboxymethyl cellulose, dextrins, gelatin and/or casein.

In an aspect, the adhesive polymer component of (a) comprises polyvinyl alcohol, and wherein the polyvinyl acetate and polyvinyl alcohol together comprise from about 40 wt % to about 60 wt % of the aqueous adhesive composition of (a); or wherein the adhesive polymer component of (a) further comprises polyvinyl alcohol, and wherein the polyvinyl acetate and polyvinyl alcohol together comprise from about 45 wt % to about 55 wt % of the adhesive polymer component of (a).

In an aspect, the dry weight percent of the adhesive polymer component of (a) present in the extended aqueous adhesive composition is from about 40 wt % to about 95 wt % of the total dry weight of the extended aqueous adhesive composition. In an aspect, the dry weight percent of the adhesive polymer component of (a) present in the extended aqueous adhesive composition is from about 50 wt % to about 85 wt % of the total dry weight of the extended aqueous adhesive composition. In an aspect, the dry weight percent of the adhesive polymer component of (a) present in the extended aqueous adhesive composition is from about 60 wt % to about 85 wt % of the total dry weight of the extended aqueous adhesive composition. In an aspect, the dry weight percent of the adhesive polymer component of (a) present in the extended aqueous adhesive composition is from about 65 wt % to about 80 wt % of the total dry weight of the extended aqueous adhesive composition.

In an aspect, the polyvinyl acetate is present in an amount of from about 40 wt % to about 60 wt % of the total dry weight of the extended aqueous adhesive composition.

The aqueous saccharide composition used in the present method comprises fructose and glucose in a fructose to glucose weight ratio of from about 3:10 to about 10:3. In an aspect, the aqueous saccharide composition is provided by obtaining fructose and glucose from separate sources and mixing the fructose with the glucose in the identified ratios. In an aspect, the aqueous saccharide composition is provided by obtaining starch from an appropriate carbohydrate source, such as maize, wheat, or potato and further breaking down the starch into glucose and converting some of the glucose to fructose to provide a mixture of glucose and fructose in the identified ratios using methods such as isomerization enzymes that convert a portion of the glucose to fructose.

In an aspect, the aqueous saccharide composition is provided as a liquid composition. In an aspect, the aqueous saccharide composition is provided as a fructose/glucose containing syrup. In an aspect, the aqueous saccharide composition is provided as a high fructose corn syrup.

In an aspect, the aqueous saccharide composition of b) has a total saccharides dry solids content of at least about 75 percent by weight. In an aspect, the aqueous saccharide composition of b) has a total saccharides dry solids content of at least about 80 percent by weight. In an aspect, the aqueous saccharide composition of b) has a total saccharides dry solids content of at least about 85 percent by weight. In an aspect, the aqueous saccharide composition of b) has a total saccharides dry solids content of at least about 90 percent by weight.

In an aspect, the aqueous saccharide composition has a fructose to glucose weight ratio of from about 3:8 to about 8:3. In an aspect, the aqueous saccharide composition has a fructose to glucose weight ratio of from about 3:7 to about 7:3. In an aspect, the aqueous saccharide composition has a fructose to glucose weight ratio of from about 3:7 to about 7:3. In an aspect, the aqueous saccharide composition has a fructose to glucose weight ratio of from about 4:6 to about 6:4. In an aspect, the aqueous saccharide composition has a fructose to glucose weight ratio of from about 4:5 to about 8:5, or alternatively from about 2:4 to about 7:5. In an aspect, the aqueous saccharide composition has a fructose to glucose weight ratio of from about 5:5 to about 8:5, or alternatively from about 2.4:4 to 6.5:5. In an aspect, the aqueous saccharide composition has a fructose to glucose weight ratio of from about 5:5 to about 7:5, or alternatively from about 2.4:4 to 6:5. In an aspect, the aqueous saccharide composition has a fructose to glucose weight ratio of from about 5:5 to about 6:5, or in an alternative from about 2.4:4 to 5:5.

In an aspect, the aqueous saccharide composition of (b) further comprises a saccharide that is not fructose or glucose, wherein the fructose and glucose combined is at least about 70 wt % of the saccharide present in the aqueous saccharide composition of (b). In an aspect, the fructose and glucose combined is at least about 75 wt % of the saccharide present in the aqueous saccharide composition of (b). In an aspect, the fructose and glucose combined is at least about 80 wt % of the saccharide present in the aqueous saccharide composition of (b). In an aspect, the fructose and glucose combined is at least about 90 wt % of the saccharide present in the aqueous saccharide composition of (b). In an aspect, the fructose and glucose combined is at least about 95 wt % of the saccharide present in the aqueous saccharide composition of (b).

In an aspect, the aqueous saccharide composition of (b) further comprises a saccharide that is not fructose or glucose, wherein the fructose and glucose combined is from about 70 wt % to about 95 wt % of the saccharide present in the aqueous saccharide composition of (b). In an aspect, the fructose and glucose combined is from about 75 wt % to about 95 wt % of the saccharide present in the aqueous saccharide composition of (b). In an aspect, the fructose and glucose combined is from about 80 wt % to about 95 wt % of the saccharide present in the aqueous saccharide composition of (b). In an aspect, the fructose and glucose combined is from about 70 wt % to about 90 wt % of the saccharide present in the aqueous saccharide composition of (b). In an aspect, the fructose and glucose combined is from about 75 wt % to about 90 wt % of the saccharide present in the aqueous saccharide composition of (b). In an aspect, the fructose and glucose combined is from about 80 wt % to about 90 wt % of the saccharide present in the aqueous saccharide composition of (b). In an aspect, the fructose and glucose combined is from about 70 wt % to about 80 wt % of the saccharide present in the aqueous saccharide composition of (b). In an aspect, the fructose and glucose combined is from about 75 wt % to about 80 wt % of the saccharide present in the aqueous saccharide composition of (b). In an aspect, the fructose and glucose combined is from about 80 wt % to about 80 wt % of the saccharide present in the aqueous saccharide composition of (b).

In an aspect, the aqueous saccharide composition of (b) further comprises from about 2 percent by dry weight to about 30 percent by dry weight disaccharides.

In an aspect, the aqueous saccharide composition of (b) further comprises from about 0.5 percent by dry weight to about 10 percent by dry weight of trisaccharides.

In an aspect, the aqueous saccharide composition of (b) further comprises from about 0.5 percent by dry weight to about 10 percent by dry weight of polysaccharides comprising three or more saccharide units.

In an aspect, the aqueous saccharide composition of (b) comprises from 73 to 85 percent by dry weight of the aqueous saccharide composition of b), from 10 to 20 percent by dry weight disaccharides, and from 2 to 9 percent by dry weight trisaccharides (for example, from 2 to 8 percent by dry weight of trisaccharides.

In an aspect, the extended aqueous adhesive composition comprises less than about 50 percent by weight water; or wherein the extended aqueous adhesive composition comprises less than about 45 percent by weight water.

Further other components can be wetting agents, adhesion promoters, foam generators, defoamers, rheology modifiers, plasticizer, coalescing agents, dyes, pigments, fragrances, tackifiers, waxes, UV indicators, humectants, pH-adjusters and/or buffers, hardeners such as acidic metal salts such as $AlCl_3$, $FeCl$, $Cr(NO_3)_3$, crosslinkers such as polyisocyanates, boric acid and/or their salts or formaldehyde-urea resins and formaldehyde-phenol resins, fillers and anti-caking agents such as carbonates, clays, silicates, hydrophobic and hydrophilic silica, pyrogenic or precipitated silicic acid, microsilica, kaolin, talc, magnesium hydrosilicate, light spar, polysaccharides such as starches, mica, nut shell flours, and wood flour. Preferred fillers are calcium carbonates, clays and silica.

While use of biocides and other types of preservatives can be avoided due to the powdered state of the adhesive formulation, such additives may be added if desired, for instance to prolong the shelf life after re-dispersion. Preservatives for use herein include those conventionally used in aqueous adhesives such as benzoates, amides and fluorides such as sodium fluoride.

Total amounts of such additives range preferably from about 0 to 500 parts per 100 parts of organic polymeric adhesive component. More preferred amounts are from about 0 to 200 parts, and in particular from about 1 to 100 parts per 100 parts of organic polymeric adhesive component.

The extended aqueous adhesive composition is prepared by mixing the adhesive polymer component a) with the aqueous saccharide composition b) so that the aqueous saccharide composition is present in the extended aqueous adhesive composition in from about 1 wt % to about 50 wt % based on total dry solids of the aqueous saccharide composition and the adhesive polymer component. In an aspect, the aqueous saccharide composition b) may be mixed with the adhesive polymer component a) in one or more successive parts. In an aspect, saccharide components other than the fructose and glucose may be provided as a conventional ingredient in the adhesive polymer component a), with additional saccharide components including the fructose and glucose in the aqueous saccharide composition b). It will be understood that for purposes of determining the relative saccharide content of the present extended aqueous adhesive composition, all saccharide components present in the composition will be deemed to be part of the aqueous saccharide composition b) regardless of timing of mixing with the adhesive polymer component a).

In an aspect, the extended aqueous adhesive composition comprises from about 5 to about 40 percent by dry weight of the aqueous saccharide composition of b). In an aspect, the extended aqueous adhesive composition comprises from about 10 to about 40 percent by dry weight of the aqueous saccharide composition of b). In an aspect, the extended aqueous adhesive composition comprises from about 20 to about 40 percent by dry weight of the aqueous saccharide composition of b). In an aspect, the extended aqueous adhesive composition comprises from about 25 to about 40 percent by dry weight of the aqueous saccharide composition of b). In an aspect, the extended aqueous adhesive composition comprises from about 5 to about 35 percent by dry weight of the aqueous saccharide composition of b). In an aspect, the extended aqueous adhesive composition comprises from about 10 to about 35 percent by dry weight of the aqueous saccharide composition of b). In an aspect, the extended aqueous adhesive composition comprises from about 20 to about 35 percent by dry weight of the aqueous saccharide composition of b b). In an aspect, the extended aqueous adhesive composition comprises from about 25 to about 35 percent by dry weight of the aqueous saccharide composition of b). In an aspect, the extended aqueous adhesive composition comprises from about 5 to about 20 percent by dry weight of the aqueous saccharide composition of b). In an aspect, the extended aqueous adhesive composition comprises from about 10 to about 20 percent by dry weight of the aqueous saccharide composition of b).

In an aspect, the extended aqueous adhesive composition comprises from 16 to about 40 percent by dry weight of the aqueous saccharide composition of b).

In an aspect, the extended aqueous adhesive composition comprises from about 5 to 40 percent by dry weight of the fructose and glucose combined. In an aspect, the extended aqueous adhesive composition comprises from about 10 to 35 percent by dry weight of the fructose and glucose combined. In an aspect, the extended aqueous adhesive composition comprises from about 16 to 30 percent by dry weight of the fructose and glucose combined.

In an aspect, the extended aqueous adhesive composition has a total dry solids content of from about 45 wt % to about 70 wt %.

In an aspect, the extended aqueous adhesive composition comprises less than 50 percent by weight water. In an aspect, the extended aqueous adhesive composition comprises less than 45 percent by weight water. In an aspect, the extended aqueous adhesive composition has a water content percentage that is less than the water content percentage of the aqueous adhesive composition of a).

In an aspect, the extended aqueous adhesive composition adhesive composition comprises
  a) an adhesive polymer component wherein at least about 75% of adhesive polymer materials present in the adhesive polymer component is polyvinyl acetate, and
  b) a saccharide composition comprising fructose and glucose in a fructose to glucose weight ratio of from about 3:10 to about 10:3,
    wherein the fructose and glucose combined are at least about 50 percent of all saccharides present in the saccharide composition, and
    wherein the saccharide composition has a total saccharides dry solids content of at least 70 percent by weight based on the total saccharide composition;
  wherein the saccharide composition is present in the extended aqueous adhesive composition in an amount of from about 5 to about 50 percent by dry weight of the saccharide composition.

The extended aqueous adhesive compositions as described herein may be used to bond one substrate to a second similar or different substrate. In an aspect, the substrates to be bonded are porous substrates including paper and wood. As used herein "paper" means both paper and paperboard products, both single- and multi-ply (e.g., paper laminates, corrugated boards, solid fibers) sheets made from without limitation, Kraft paper, paper made from recycled fibers and the like. The term "wood" is meant to include wood composites and particle board and encompass chipboard, particleboard, medium density fiberboard, high density fiberboard, oriented strand board, hardboard, hardwood plywood, veneer core plywood, isocyanate or phenolic impregnated strawboard, and wood composites made from wood fiber and polymers, such as recycled polyethylene.

Substrates may be bonded together by a process wherein the adhesive composition is applied to at least a first substrate, a second substrate is brought in contact with the adhesive composition applied to the first substrate, and the applied adhesive is subjected to conditions which will allow the adhesive composition to form a set bond, such conditions optionally including directing air and/or heat to the location of the bond and/or applying pressure to the substrates to provided good contact of the substrates to each other at the location of the bond.

In an aspect, the extended aqueous adhesive compositions are used to adhere at least three layers of wood substrates together to form a laminate construction.

In an aspect, the extended aqueous adhesive compositions are used to adhere a first surface of a first wood substrate having an end-grain surface to a second substrate.

In an aspect, the extended aqueous adhesive compositions are used to adhere a first surface of a first wood substrate having a flat-grain surface to a second substrate.

EXAMPLES

Test Methodology

Viscosity. Viscosity measurements were obtained using a Brookfield AMETEK DV2T Viscometer from AMETEK Brookfield (Middleboro, MA) where the measurement is taken at a sample temperature of 25° C. at 10 rpm using Spindle #4. Where indicated, Viscosity was evaluated using Rapid Visco Analyzer ("RVA") Method 01.05 (which is a measure of viscosity under shear conditions). Test Conditions: 25°, 160 rpm, standard cup and spindle, 30 g sample weight. See https://www.perten.com/Global/Application%20notes/RVA/General%20Pasting%20Method%20-%20RVA%2001.05.pdf Dry Strength Adhesion Value is determined under dry conditions with the methodology set forth in ASTM D7998-15 cohesion test method using an ABES adhesive tester (Adhesive Evaluation Systems), with the following methodology notes.

Wood test pieces were prepared with lightly-sanded, white pine blanks cut to the specified dimensions. The test pieces were conditioned at ambient conditions and humidity (21-24C and 40-50% RH). All dry bond testing was completed within one 24 hr period with a control sample included amongst the materials in use.

5 Milligrams of adhesive sample (+/−1.0 mg) were placed on the end of the one of the test pieces. A corresponding blank test piece was overlapped with the piece containing the adhesive sample inside the ABES clamping mechanism. The ABES test was carried out with a 40 second pressing time at 120 degrees C. The test pieces were then air-cooled for 5 seconds and then pulled at a controlled rate of 500N/s+/−25 Ns for 4 seconds to generate the corresponding pull force measurement.

Wet Strength Adhesion Value is determined under wet conditions with the methodology set forth in ASTM D7998-15 cohesion test method using an ABES adhesive tester (Adhesive Evaluation Systems), with the following methodology notes.

Wood test pieces were prepared the same as with the dry bond measurement with lightly sanded, white pine blanks cut to the specified dimensions. The test pieces were conditioned at ambient conditions and humidity (21-24C and 40-50% RH).

5 Milligrams of adhesive sample (+/−1.0 mg) were placed on the end of the one of the test pieces. A corresponding blank test piece was overlapped with the piece containing the adhesive sample inside the ABES clamping mechanism. The ABES test was carried out with a 40 second pressing time at 120 degrees C. The test pieces were air-cooled for 5 seconds and then removed from the ABES clamping mechanism and totally submerged in an ambient tap water bath for one hour. After the requisite time period, the test pieces were then removed from the tap water bath and allowed to dry for approximately 2 hours or until the wood substrate no longer felt damp to the touch. In addition, for some adhesive formulations, a matching set of test pieces were allowed to dry for 24 hours before additional testing. The dried glued test pieces were then placed back in the ABES clamping mechanism at ambient temperatures and pulled at a controlled rate of 500N/s+/−25 Ns for 4 seconds to generate the corresponding pull force measurement. This wet bond performance was then compared against the dry bond performance that was previously recorded.

Materials Used

| Name used in Example tables | Source |
| --- | --- |
| K-325 PVAc Glue | KiiLTO Kestokol D-325 HF-T2547 Polyvinyl Acetate wood adhesive: 50-52% dry solids |
| 63DE Corn Syrup | Cargill[1] Clearsweet™ 63/43 Corn Syrup: 82-84% dry solids. This corn syrup does not contain fructose. Comparative Example |
| 43DE M Corn Syrup | Cargill Clearsweet™ 43M/43 Corn Syrup: 80-81% dry solids is a corn syrup that does not contain fructose. It has a DE of 43 and a Baumé measurement of 43 with higher Maltose content than Clearsweet™ 43/43 Corn Syrup Comparative Example |
| 43DE Corn Syrup | Cargill Clearsweet™ 43/43 Corn Syrup: 80-81% dry solids. This corn syrup does not contain fructose. Comparative Example |
| 25DE Corn Syrup | Cargill Cleardex™ 25/42 Corn Syrup: 77-79% dry solids. This is a corn syrup that does not contain fructose. Comparative Example |
| 44DE Corn Syrup | This is a lab-prepared corn syrup having a DE of 44 that does not contain fructose. Comparative Example |
| 34DE Blend Corn Syrup | This is a lab-prepared corn syrup having a DE of 34 that does not contain fructose. This corn syrup is prepared by blending 25 DE and 44DE syrups. Comparative Example |
| 36DE Corn Syrup | This is a lab prepared corn syrup having a DE of 36 that does not contain fructose. This corn syrup is prepared by blending 25 DE and 44DE syrups. Comparative Example |
| Isoclear 42 Corn Syrup | 42% Fructose and 52% glucose by dry weight Blend syrup. 80-82% solids from Cargill This is a commercially available syrup comprising a blend of fructose and glucose. |
| Isoclear 55 Corn Syrup (IC 55) | Cargill Isoclear 55 High Fructose Syrup: 55% fructose and 45% glucose by dry weight syrup having 76-79% dry solids. This is a commercially available syrup comprising a blend of fructose and glucose. |
| C*TruSweet 01742 | Cargill C*TruSweet™ 01742 Dextrose/Fructose Syrup: 45% glucose, 31% fructose, 15% disaccharides, and 5% trisaccharides by dry weight syrup having 81-83% dry solids |
| C*TruSweet 01743 | Cargill C*TruSweet™ 01743 Dextrose/Fructose Syrup: 42-47% glucose, 29-33% fructose, 10-20% disaccharides, and 0-10% trisaccharides by dry weight syrup having 74.5-76.5% dry solids |
| C*Sweet 01521/44-47DE | A wheat-derived Dextrose syrup that does not contain Fructose. 71-73% solids. Available from Cargill Comparative Example |
| C*Sweet D-02761 | A wheat-derived Dextrose syrup that does not contain Fructose. 71-73% solids. Available from Cargill Comparative Example |
| Fructose Syrup | Composition prepared by dissolving dry, crystalline fructose (NOW Foods, Bloomingdale, IL) in water to prepare a 70-72% solids syrup Comparative Example |

[1]Commercially available from Cargill, Incorporated Dextrose Equivalent (DE) is a measure of the amount of reducing sugars present in a sugar product, expressed as a percentage on a dry basis relative to dextrose.

Example 1

Samples prepared at 25% weight-to-weight/Carbohydrate to PVAc Glue ratios were tested at 30 and 90 days to observe viscosity changes over time. Additionally, adhesion performance was using sample formulations that were aged for the times indicated prior to adhering substrates together. Bond strengths were determined according to ASTM D7998-15.

| Sample ID | Initial Viscosity (cP) | 30-day Viscosity (cP) | 90-day Viscosity (cP) | Initial N/mm2 | 30-day N/mm2 | 90-day N/mm2 | 90-day N/mm2 Wet Soak |
|---|---|---|---|---|---|---|---|
| K-325 PVAc Glue (Control) | 5800 | | 5680 | 4.9 | 4.2 | 3.4 | 5.3 |
| PVAc + 63DE Corn Syrup Comparative Example | 2780 | 3260 | 4380 | 4.4 | 6.0 | 4.6 | 4.6 |
| PVAc + 43DE M Corn Syrup Comparative Example | 3220 | 3680 | 4880 | 5.1 | 4.9 | 4.6 | |
| PVAc + 43DE Corn Syrup Comparative Example | 3700 | 3820 | 4700 | 5.2 | 5.0 | 4.2 | |
| PVAc + 25DE Corn Syrup Comparative Example | 42400 | | | 5.6 | | | |
| PVAc + IC55 High Fructose Corn Syrup | 2220 | 2060 | 2960 | 4.9 | 5.5 | 4.5 | 4.6 |
| PVAc + 34DE Blend Corn Syrup Comparative Example | 8780 | 5460 | 8900 | 4.4 | 4.9 | 3.8 | 4.2 |

Conclusions

Viscosity of the comparative samples significantly increased over time as compared to the sample wherein the aqueous saccharide composition comprised fructose and glucose. The sample comprising 25DE Corn Syrup was not stable over time. Bond strengths of samples that could be tested was not statistically different. Lower initial viscosity and lack of significant viscosity build over time without sacrifice of bond strength properties as observed in the sample wherein the aqueous saccharide composition comprised fructose and glucose is seen to provide significant material handling properties, blendability of the materials forming the extended adhesive composition, and flexibility in selecting the desired viscosity of the ultimate extended adhesive product.

Example 2

Samples prepared at 25% weight-to-weight/Carbohydrate to PVAc Glue ratios at various DE levels were tested for viscosity and bond strength in comparison with samples wherein the aqueous saccharide composition comprised fructose and glucose. Bond strengths were determined according to ASTM D7998-15.

| Sample ID-25% Blend Commercial Corn Syrups | % ds | Brookfield Viscosity (cP) | Bond Strength (N/mm2) |
|---|---|---|---|
| Sample of K-325 PVAc Glue-1 gallon (Control) | 50.42 | 7000 | 3.7 |
| Sample of K-325 PVAc Glue-1 gallon 1 Hour Soak (Control) | 50.79 | 7080 | 5.4 |
| 25% w/w 25DE Comparative Example | 59.59 | 30500 | 3.8 |
| 25% w/w 25DE-1 Hour Soak Comparative Example | 60.19 | 38600 | 4.9 |
| 25% w/w 36DE Comparative Example | 57.53 | 3980 | 4.4 |
| 25% w/w 36DE-1 Hour Soak Comparative Example | 59.09 | 4180 | 3.9 |
| 25% w/w 44DE Comparative Example | 58.17 | 3460 | 4.5 |
| 25% w/w 44DE-1 Hour Soak Comparative Example | 58.56 | 3620 | 4.6 |
| 25% w/w Isoclear 55 | 56.45 | 2020 | 4.8 |
| 25% w/w Isoclear 55-1 Hour Soak | 56.61 | 1940 | 4.1 |

Conclusions

All the samples had similar bond strength. The observed viscosity of the samples comprising with 25DE syrup/glue blend was very high and unstable. Other syrup/glue blends had lower viscosities than the glue alone. However, the sample wherein the aqueous saccharide composition comprised fructose and glucose had even lower viscosity without sacrifice of bond strength properties. It is noteworthy that the low viscosity observed in the sample wherein the aqueous saccharide composition comprised fructose and glucose was obtained even though the total solids content was in the same range as the compositions to which this extended adhesive was compared.

Example 3

Samples prepared at 25% weight-to-weight/Carbohydrate to PVAc Glue ratios at various DE levels were tested for viscosity and bond strength in comparison with samples wherein the aqueous saccharide composition comprised fructose and glucose. Bond strengths were determined according to EN 205.

| Sample ID-25% w/w EU Syrup Blends/Wet Soak | % Dry solids | Brookfield Viscosity (cP) | Average Bond Strength (N/mm2) |
|---|---|---|---|
| K-325 PVAc Glue (Control) | 50.84 | 6500 | 4.6 |
| K-325 PVAc Glue 1 Hour Soak (Control) | | | 4.6 |
| K-325 PVAc Glue/C*TruSweet 01742 | 57.34 | 1840 | 5.4 |
| K-325 PVAc Glue/C*TruSweet 01742-1 Hour Soak | | | 5.5 |
| K-325 PVAc Glue/C*Sweet 01521/44-47DE (Comparative) | 58.88 | 3060 | 4.7 |
| K-325 PVAc Glue/C*Sweet 01521/44-47DE/-1 Hour Soak (Comparative) | | | 4.9 |

Conclusions

All the samples had similar bond strength. The observed viscosity of the samples comprising with 25DE syrup/glue blend was very high and unstable. Other syrup/glue blends had lower viscosities than the glue alone. However, the sample wherein the aqueous saccharide composition comprised fructose and glucose had lower viscosity than the control and comparative examples without sacrifice of bond strength properties.

Example 4

Extended adhesive samples were prepared with aqueous saccharide composition comprising fructose and glucose at increasing relative amounts to observe changes in viscosity and strength in comparison to a control adhesive sample.

| Sample ID-Increasing Amount of Carbohydrate | % Dry solids | Brookfield Viscosity (cP) | Average Bond Strength (N/mm2) |
|---|---|---|---|
| K-325 PVAc Glue-RT Bucket (Control) | 50.84 | 6460 | 4.6 |
| C*TruSweet 01742 25% w/w in K-325 PVAc Glue | 57.34 | 1940 | 5.4 |
| C*TruSweet 01742 30% w/w in K-325 PVAc Glue | 58.52 | 1650 | 4.5 |
| C*TruSweet 01742 35% w/w in K-325 PVAc Glue | 59.32 | 1300 | 4.5 |

Conclusions

The samples comprising fructose and glucose exhibited similar bond strength as compared to the control adhesive despite the apparent dilution of the adhesive, increase in dry solids content and decrease in viscosity. Lower viscosity without sacrifice of bond strength properties as observed in the sample wherein the aqueous saccharide composition comprised fructose and glucose is seen to provide significant material handling properties, blendability of the materials forming the extended adhesive composition, and flexibility in selecting the desired viscosity of the ultimate extended adhesive product

Example 5

Adhesives were prepared with addition of various quantities of carbohydrate based extending additives.

Viscosity was evaluated using Rapid Visco Analyzer ("RVA") Method 01.05 (which is a measure of viscosity under shear conditions), and bond strength was evaluated according to ASTM D7998-15.

Viscosity and bond strength data obtained is shown in the Tables.

| | Bond Strength | | |
|---|---|---|---|
| Ratio (% K-325/% Carbohydrate) w/w | C*Sweet D-02761 Bond Strength (N/mm$^2$) | IsoClear 42 Bond Strength (N/mm$^2$) | Fructose Syrup Bond Strength (N/mm$^2$) |
| 100/0 | 5.1 | 5.1 | 5.1 |
| 75/25 | 5.0 | 4.9 | 5.3 |
| 70/30 | 5.3 | 4.5 | 4.7 |
| 65/35 | 5.4 | 4.5 | 4.5 |
| 60/40 | 4.9 | 4.7 | 3.8 |
| 55/45 | 4.1 | 3.9 | 3.9 |

| | Viscosity | | |
|---|---|---|---|
| Ratio (% K-325/% Carbohydrate) w/w | C*Sweet D-02761 Viscosity(cP) | IsoClear 42 Viscosity(cP) | Fructose Syrup Viscosity(cP) |
| 100/0 | 2745 | 2745 | 2745 |
| 75/25 | 1725 | 762 | 1073 |
| 70/30 | 1725 | 603 | 809 |
| 65/35 | 2800 | 471 | 656 |
| 60/40 | 413 | 413 | 592 |
| 55/45 | 343 | 356 | 557 |

Conclusions

All the samples had similar bond strength, despite addition of carbohydrate extender. Surprisingly, the sample wherein the aqueous saccharide composition comprised fructose and glucose had even lower viscosity without sacrifice of bond strength properties. Moreover, the observed viscosity change upon increase of the relative amount of the IsoClear 42 product is predictable and effectively reduces the viscosity to a useful low level, while the observed viscosity change upon increase of the relative amount of the C*Sweet D-02761 is unpredictable.

Lower viscosity without sacrifice of bond strength properties as observed in the sample wherein the aqueous saccharide composition comprised fructose and glucose is seen to provide significant material handling properties, blendability of the materials forming the extended adhesive composition, and flexibility in selecting the desired viscosity of the ultimate extended adhesive product.

Example 6

Extended adhesive samples are prepared with C*TruSweet 01743 similar to those tested in Examples 4 and 5 using C*TruSweet 01742. The extended adhesive samples prepared with C*TruSweet 01743 exhibit similar properties as set forth for the extended adhesive samples prepared using C*TruSweet 01742.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by ¹/₁₀ of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:
1. A method of extending an aqueous adhesive composition, the method comprising:
a) providing an aqueous adhesive component wherein at least about 75% of adhesive polymer materials present in the aqueous adhesive component is polyvinyl acetate;
b) providing an aqueous saccharide composition comprising fructose and glucose in a fructose to glucose weight ratio of from about 3:10 to about 10:3,
wherein the fructose and glucose combined are at least about 50 percent of all saccharides present in the aqueous saccharide composition, and
wherein the aqueous saccharide composition has a total saccharides dry solids content of at least 70 percent by weight based on the total aqueous saccharide composition; and
c) mixing the adhesive polymer component with the aqueous saccharide composition to form an extended aqueous adhesive composition comprising from about 5 to about 50 percent by dry weight of the saccharide composition.
2. The method of claim 1, wherein the extended aqueous adhesive composition comprises from about 5 to about 40 percent by dry weight of the aqueous saccharide composition of b); or wherein the extended aqueous adhesive composition comprises from about 10 to about 40 percent by dry weight of the aqueous saccharide composition of b); or wherein the extended aqueous adhesive composition comprises from about 20 to about 40 percent by dry weight of the aqueous saccharide composition of b); or wherein the extended aqueous adhesive composition comprises from about 25 to about 40 percent by dry weight of the aqueous saccharide composition of b); or
wherein the extended aqueous adhesive composition comprises from about 5 to about 35 percent by dry weight of the aqueous saccharide composition of b); or wherein the extended aqueous adhesive composition comprises from about 10 to about 35 percent by dry weight of the aqueous saccharide composition of b); or wherein the extended aqueous adhesive composition comprises from about 20 to about 35 percent by dry weight of the aqueous saccharide composition of b); or wherein the extended aqueous adhesive composition comprises from about 25 to about 35 percent by dry weight of the aqueous saccharide composition of b); or
wherein the extended aqueous adhesive composition comprises from about 5 to about 20 percent by dry weight of the aqueous saccharide composition of b); or wherein the extended aqueous adhesive composition comprises from about 10 to about 20 percent by dry weight of the aqueous saccharide composition of b); or
wherein the extended aqueous adhesive composition comprises from 16 to 40 percent by dry weight of the aqueous saccharide composition of b).
3. The method of claim 1, wherein the extended aqueous adhesive composition comprises from about 5 to 40 percent by dry weight of the fructose and glucose combined; or wherein the extended aqueous adhesive composition comprises from about 10 to 35 percent by dry weight of the fructose and glucose combined; or wherein the extended aqueous adhesive composition comprises from about 16 to 30 percent by dry weight of the fructose and glucose combined.
4. The method of claim 1, wherein the extended aqueous adhesive composition has a total dry solids content of from about 45 wt % to about 70 wt %.
5. The method of claim 1, wherein the extended aqueous adhesive composition comprises less than 50 percent by weight water; or wherein the extended aqueous adhesive composition comprises less than 45 percent by weight water.
6. The method of claim 1, wherein the extended aqueous adhesive composition has a water content percentage that is less than the water content percentage of the aqueous adhesive composition of a).
7. The method of claim 1, wherein the fructose and glucose combined comprise at least 70 percent by dry weight of the aqueous saccharide composition of b); or wherein the fructose and glucose combined comprise at least 75 percent by dry weight of the aqueous saccharide composition of b); or wherein the fructose and glucose combined comprise at least 80 percent by dry weight of the aqueous saccharide composition of b); or
wherein the fructose and glucose combined comprises from about 70 percent to about 95 percent by dry weight of the aqueous saccharide composition of b); or wherein the fructose and glucose combined comprises from about 70 percent to about 90 percent by dry weight of the aqueous saccharide composition of b); or wherein the fructose and glucose combined comprises from about 70 percent to about 85 percent by dry weight of the aqueous saccharide composition of b).

8. The method of claim 1, wherein the aqueous saccharide composition of b) has a fructose to glucose weight ratio of from about 3:8 to about 8:3; or wherein the aqueous saccharide composition of b) has a fructose to glucose weight ratio of from about 3:7 to about 7:3; or wherein the aqueous saccharide composition of b) has a fructose to glucose weight ratio of from about 4:6 to about 6:4; or wherein the aqueous saccharide composition of b) has a fructose to glucose weight ratio of from about 4:5 to about 8:5; or wherein the aqueous saccharide composition of b) has a fructose to glucose weight ratio of from about 5:5 to about 8:5; or wherein the aqueous saccharide composition of b) has a fructose to glucose weight ratio of from about 5:5 to about 7:5; or wherein the aqueous saccharide composition of b) has a fructose to glucose weight ratio of from about 5:5 to about 6:5.

9. The method of claim 1, wherein the aqueous saccharide composition of b) has a total saccharides dry solids content of at least about 75 percent by weight; or wherein the aqueous saccharide composition of b) has a total saccharides dry solids content of at least about 80 percent by weight; or wherein the aqueous saccharide composition of b) has a total saccharides dry solids content of at least about 85 percent by weight; or wherein the aqueous saccharide composition of b) has a total saccharides dry solids content of at least about 90 percent by weight.

10. The method of claim 1, wherein the aqueous saccharide composition of b) further comprises a saccharide that is not fructose or glucose, and wherein the fructose and glucose combined is at least about 70 wt % of the saccharide present in the aqueous saccharide composition of b); or wherein the aqueous saccharide composition of b) further comprises a saccharide that is not fructose or glucose, and wherein the fructose and glucose combined is at least about 75 wt % of the saccharide present in the aqueous saccharide composition of b); or wherein the aqueous saccharide composition of b) further comprises a saccharide that is not fructose or glucose, and wherein the fructose and glucose combined is at least about 80 wt % of the saccharide present in the aqueous saccharide composition of b); or wherein the aqueous saccharide composition of b) further comprises a saccharide that is not fructose or glucose, and wherein the fructose and glucose combined is at least about 85 wt % of the saccharide present in the aqueous saccharide composition of b); or wherein the aqueous saccharide composition of b) further comprises a saccharide that is not fructose or glucose, and wherein the fructose and glucose combined is at least about 90 wt % of the saccharide present in the aqueous saccharide composition of b); or wherein the aqueous saccharide composition of b) further comprises a saccharide that is not fructose or glucose, and wherein the fructose and glucose combined is at least about 95 wt % of the saccharide present in the aqueous saccharide composition of b); or wherein the aqueous saccharide composition of b) further comprises a saccharide that is not fructose or glucose, and wherein the fructose and glucose combined is from about 70 wt % to about 95 wt % of the saccharide present in the aqueous saccharide composition of b); or wherein the aqueous saccharide composition of b) further comprises a saccharide that is not fructose or glucose, and wherein the fructose and glucose combined is from about 75 wt % to about 95 wt % of the saccharide present in the aqueous saccharide composition of b); or wherein the aqueous saccharide composition of b) further comprises a saccharide that is not fructose or glucose, and wherein the fructose and glucose combined is from about 80 wt % to about 95 wt % of the saccharide present in the aqueous saccharide composition of b); or wherein the aqueous saccharide composition of b) further comprises a saccharide that is not fructose or glucose, and wherein the fructose and glucose combined is from about 70 wt % to about 90 wt % of the saccharide present in the aqueous saccharide composition of b); or wherein the aqueous saccharide composition of b) further comprises a saccharide that is not fructose or glucose, and wherein the fructose and glucose combined is from about 75 wt % to about 90 wt % of the saccharide present in the aqueous saccharide composition of b); or wherein the aqueous saccharide composition of b) further comprises a saccharide that is not fructose or glucose, and wherein the fructose and glucose combined is from about 80 wt % to about 90 wt % of the saccharide present in the aqueous saccharide composition of b); or wherein the aqueous saccharide composition of b) further comprises a saccharide that is not fructose or glucose, and wherein the fructose and glucose combined is from about 70 wt % to about 80 wt % of the saccharide present in the aqueous saccharide composition of b).

11. The method of claim 1, wherein the aqueous saccharide composition of b) comprises from about 2 percent by dry weight to about 30 percent by dry weight disaccharides.

12. The method of claim 1, wherein the aqueous saccharide composition of b) comprises from about 0.5 percent by dry weight to about 10 percent by dry weight of trisaccharides.

13. The method of claim 1, wherein the aqueous saccharide composition of b) comprises from 73 to 85 percent by dry weight of the fructose and glucose combined, from 10 to 20 percent by dry weight disaccharides, and from 2 to 8 percent by dry weight of trisaccharides.

14. The method of claim 1, wherein the dry weight percent of the adhesive polymer component of a) present in the extended aqueous adhesive composition is from about 40 wt % to about 95 wt % of the total dry weight of the extended aqueous adhesive composition; or wherein the dry weight percent of the adhesive polymer component of a) present in the extended aqueous adhesive composition is from about 50 wt % to about 85 wt % of the total dry weight of the extended aqueous adhesive composition; or wherein the dry weight percent of the adhesive polymer component of a) present in the extended aqueous adhesive composition is from about 60 wt % to about 85 wt % of the total dry weight of the extended aqueous adhesive composition; or wherein the dry weight percent of the adhesive polymer component of a) present in the extended aqueous adhesive composition is from about 65 wt % to about 80 wt % of the total dry weight of the extended aqueous adhesive composition.

15. The method of claim 1, wherein polyvinyl acetate is present in an amount of from about 40 wt % to about 60 wt % of the total dry weight of the extended aqueous adhesive composition.

16. The method of claim 1, wherein the adhesive polymer component of a) comprises a synthetic or natural adhesive polymer other than polyvinyl acetate, and wherein at least about 80% of adhesive polymer materials present in the adhesive polymer component of a) is polyvinyl acetate; or wherein at least about 90% of adhesive polymer materials present in the adhesive polymer component of a) is polyvinyl acetate; or wherein at least about 95% of adhesive polymer materials present in the adhesive polymer component of a) is polyvinyl acetate; or wherein at least about 99% of adhesive polymer materials present in the adhesive polymer component of a) is polyvinyl acetate.

17. The method of claim 16, wherein the synthetic or natural adhesive polymer other than polyvinyl acetate is selected from the group consisting of polyvinyl alcohol, polyvinyl pyrrolidone, polyacrylates, polymethacrylates, polysaccharides, and mixtures thereof.

18. The method of claim 1, wherein the adhesive polymer component of a) comprises polyvinyl alcohol, and wherein the polyvinyl acetate and polyvinyl alcohol together comprise from about 40 wt % to about 60 wt % of the aqueous adhesive composition of a); or wherein the adhesive polymer component of a) further comprises polyvinyl alcohol, and wherein the polyvinyl acetate and polyvinyl alcohol together comprise from about 45 wt % to about 55 wt % of the adhesive polymer component of a).

19. The method of claim 1, wherein the extended aqueous adhesive composition further comprises an additive selected from the group consisting of wetting agents, adhesion promoters, foam generators, defoamers, rheology modifiers, plasticizer, coalescing agents, dyes, pigments, fragrances, tackifiers, waxes, UV indicators, humectants, pH-adjusters and/or buffers, hardeners, crosslinkers, fillers and anti-caking agents.

* * * * *